March 7, 1950 G. P. ANDREWS 2,499,558
AUTOMATIC ELECTRIC BARBECUE AND BREAD TOASTER
Filed Nov. 21, 1947 2 Sheets-Sheet 1
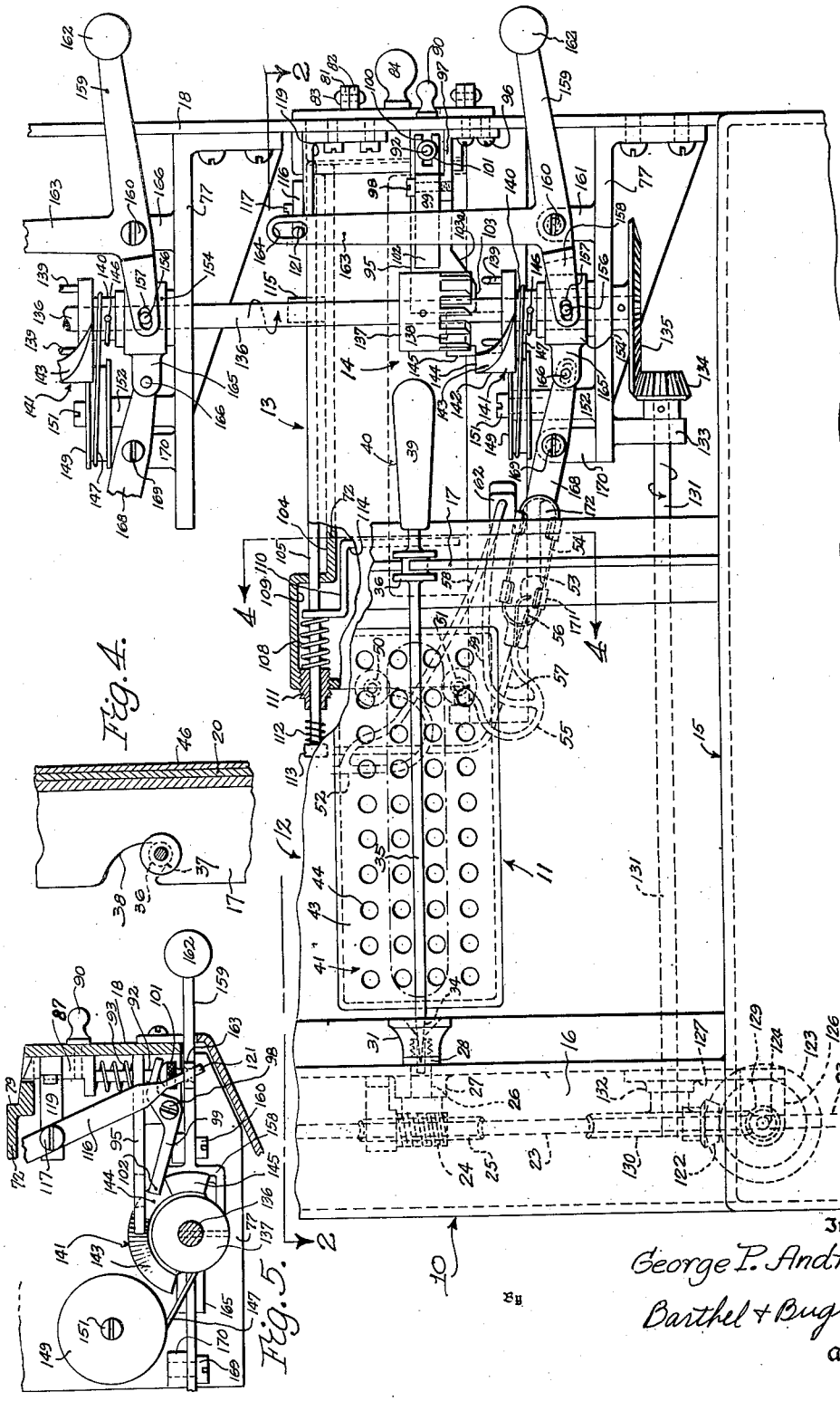
Inventor
George P. Andrews
Barthel & Bugbee
Attorneys

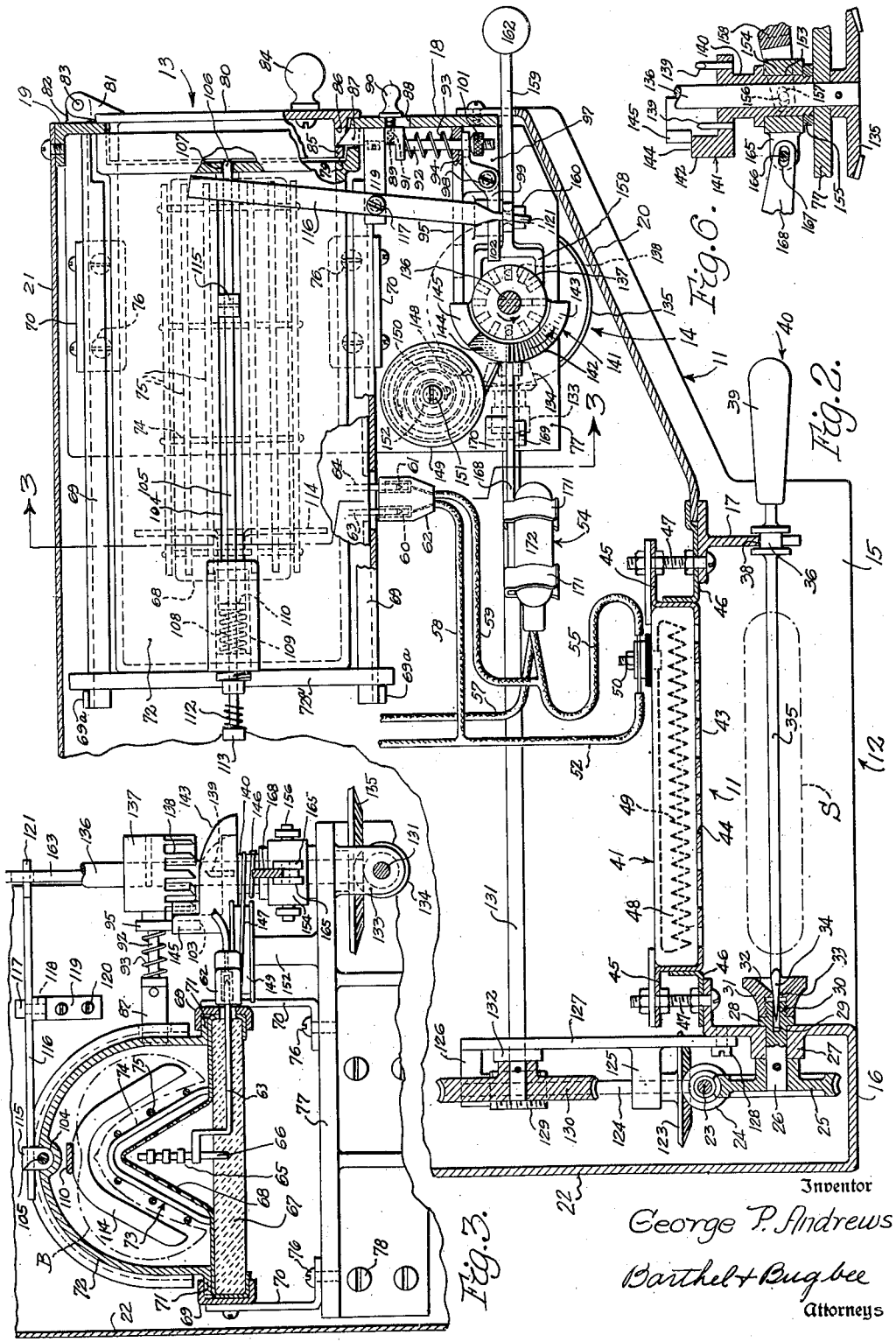

Patented Mar. 7, 1950

2,499,558

UNITED STATES PATENT OFFICE 2,499,558

AUTOMATIC ELECTRIC BARBECUE AND BREAD TOASTER

George P. Andrews, Detroit, Mich.

Application November 21, 1947, Serial No. 787,324

6 Claims. (Cl. 99—327)

This invention relates to electric grills and in in particular to automatic electric grills.

One object of this invention is to provide an automatically-timed electric grill for cooking sausages such as so-called frankfurters and also toasting buns into which the frankfurters are to be placed.

Another object is to provide an electric grill of the foregoing type wherein the sausage is automatically rotated on a spit for a predetermined time period while the bun is being toasted in an oven, mechanism being provided for automatically shutting off the electric heating current and also for opening the oven door and ejecting the bun.

Another object is to provide an electric grill of the foregoing type wherein the timing mechanism for regulating the cooking period is set in operation manually but is halted automatically.

Another object is to provide an electric grill of the foregoing type wherein mechanism is provided for warning the operator when a bread oven is empty if he attempts to start cooking a sausage, so that at no time will the operator inadvertently prepare a sausage without at the same time preparing a bun to serve with the sausage.

In the drawings:

Figure 1 is a front elevation partly in section of a portion of an electric cooker according to a preferred form of the present invention, showing only one unit and part of another unit, with cover plates removed or broken away to disclose the internal construction;

Figure 2 is a horizontal section along the line 2—2 in Figure 1;

Figure 3 is a fragmentary vertical section along the line 3—3 in Figure 2, showing the bun toaster;

Figure 4 is a fragmentary vertical section along the line 4—4 in Figure 1 showing the spit bearing;

Figure 5 is a view similar to a portion of Figure 2, but showing the timing mechanism in the unlatched position of the oven door; and Figure 6 is a vertical section through the clutching and timing mechanism shown in Figure 1.

Referring to the drawing in detail, Figures 1 and 2 show the cooker of this invention generally designated 10 as consisting of several cooking units, each generally designated 11, all of these being driven by common mechanism. For the purposes of the present invention, therefore, it is sufficient to illustrate and describe the lowermost one of these units 11.

The cooker unit 11 in turn consists generally of a sausage cooker 12 and a bun toaster 13 controlled by a timing and clutching mechanism 14. All of the cooker units 11 are mounted in tiers upon a base 15 having uprights 16 to 19 inclusive rising therefrom (Figure 2), an additional upright in the upper lefthand corner of Figure 2 being omitted from the drawing. Cover plates 20 and 21 are mounted between the uprights 17 and 18 and secured to the upright 19 respectively. The upright 16 also includes a vertical wall portion 22 which serves partly to enclose the mechanism.

The rotating parts of the cooking units 12, timing units 14 and toasting units 13 are driven from a common vertical shaft 23 from an electric motor (not shown) located within the base 15. Mounted on the shaft 23 are several worms 24 which mesh with worm gears 25 mounted on the ends of shafts 26 (Figure 2) journaled in bearing bosses 27 forming a part of the upright 16. There is one worm 24, worm gear 25 and shaft 26 for each of the sausage cooker units 12. Each of the shafts 26 on its outer end is provided with a head 28 containing a socket 29. The head 28 is provided with a reduced diameter portion 30 upon which is threaded a collar 31 having a flared entrance 32 leading to a reduced diameter bore 33 of square or other suitable cross-section.

Inserted in the bore 33 and mating therewith is the tapering tip 34 of similar cross-section to the bore 33, such as square, on the end of a sausage holding rod or spit 35. The latter near its opposite end is provided with a flanged enlargement 36 which is rotatably mounted in the lower portion 37 of a notch 38 (Figure 4) formed in the upright 17. The outer end of the holder rod 35 is provided with a handle 39 by which the sausage holder generally designated 40 may be manipulated. In this manner the sausage holder 40 is removably mounted and rotated by the collar 31 from the shaft 26.

Each of the sausage cookers 13 is provided with an electrical heating unit generally designated 41 (Figure 2), the latter being mounted in a housing 43 with perforations 44 for releasing the heat. The housing 43 is provided with spaced flanges 45 and 46 by which it is secured by screws 47 to the uprights 16 and 17 respectively. Mounted upon an insulator 48 within the housing 43 is an electrical resistance heating element 49, the opposite ends of which are led out to upper and lower terminals or binding posts 50 and 51 respectively.

Connected to the upper terminal 50 of the heat unit 41 is a conductor 52 (Figures 1 and 2) which leads to a source of electricity, such as house lighting circuit. Leading from the lower terminal 51 to one pole 53 of a mercury switch 54 (Figure 1) is a conductor 55. Leading from the opposite pole 56 of the mercury switch 54 is a conductor 57 which likewise leads to a source of electric current. Leading from the conductors 52 and 55 are branch conductors 58 and 59 which in turn lead to the terminals 60 and 61 of a connection plug 62 (Figure 2). The insulator 48 is preferably of so-called electro-asbestos, hollowed out to receive the heating element 49.

The terminals 60 and 61 fit over and engage prongs 63 and 64 which are connected to leads coming from the opposite ends of an electrical resistance heating element 65. The latter is mounted upon supports 66 (Figure 3) which in turn are seated in an insulating plate 67. A perforated guard plate 68 of V-shaped cross-section in its central portion (Figure 3) arches over the heating element 65 and has its edges bent around the insulating plate 67.

The insulating plate 67 and the bent edges of the guard 68 are clamped together by channel bars 69 mounted on angle brackets 70. The channel bars 69 also engage the flanged lower edge 71 of an approximately semi-cylindrical oven casing 72 which arches over the heating unit 65 and guard 68. Mounted upon the horizontal portions of the guard 68 is an elongated rack 73 of V-shaped cross-section (Figure 3) having uprights 74 interconnected by horizontal wires or rods 75. The bun B to be toasted is split lengthwise and placed on this rack within the oven or bun toaster 13. The angle brackets 70 are secured as at 76 to an angle shelf 77 (Figure 3) which in turn is secured as at 78 to the uprights 18 and 19.

The oven casing 72 is held in position (Figure 2) by a cross bar 72a which rests against lugs 69a extending upward from the rearward ends of the channel bars 69. The oven casing 72 is closed at its rearward end but provided with an opening 79 at its forward end to receive a swinging door 80. The latter is provided with ears 81 pivotally engaging brackets 82 extending horizontally from the upright 19, pivot pins 83 forming the pivotal connection (Figure 2). A door 80 is provided with a knob 84 by which it may be opened manually and is also provided with a flange 85 fitting within the opening 79 and having an aperture 86 therein engaged by the beveled end of a latch bolt 87. Inserted through a slot 88 in the upright 18 is the stem 89 of a knob 90, the stem 89 being threaded into a threaded hole 91.

The outer end of the latch bolt 87 is provided with a rod 92 which is encircled by a compression spring 93 and passes through a hole 94 in an angle bracket 95 which is secured as at 96 (Figure 1) to the upright 18. The bracket 95 is provided with a horizontal extension 97 in the form of a shelf which is bored and threaded to receive the threaded lower end of a vertical stud 98. Pivotally mounted on the stud 98 is a latch operating lever 99 one end of which is slotted as at 100 to receive the rod 92, the latter at its outer end being threaded to receive an adjusting nut 101. The opposite end 102 of the latch-operating lever 99 extends into proximity with cam-operated timing and clutching mechanism 14 described below. This mechanism 14 is in part actuated by a stationary cam portion 103 (Figure 1) which extends downward from the outer end of the bracket 95 and has an incline 103a.

Returning to the bun-toaster or oven 13, the casing 72 thereof is provided at its top with a groove 104 extending lengthwise, in which a rod 105 is reciprocably mounted. The forward end 106 of the rod 105 passes through an aperture 107 (Figure 2) in the oven casing 72 and is rounded to engage the edge of the door flange 85 so as to be pushed rearwardly when the door is closed and latched in the position shown in Figure 2. When the rod 105 is pushed rearwardly in this manner, it compresses a coil spring 108 (Figure 1) which is mounted in an alcove 109 of the oven casing 72, the rod 105 carrying an L-shaped bun ejector bracket 110 which not only serves to eject the bun when the door 80 is opened, but also serves to compress the spring 108. The spring 108 is seated against a hollow screw plug 111 which is bored for the passage of the rod 105. The rod 105 is encircled by a cushion spring 112 and terminates in a head 113. Secured to the forward portion of the ejector bracket 110 is an inverted V-shaped ejector 114 (Figure 3) which straddles the V-shaped bun rack 73 and guard 68. Also mounted on the rod 105 and pinned or otherwise firmly secured thereto is a contact or pusher block 115 (Figures 1 and 2) which makes contact with one end of a lever 116 (Figure 3) which is pivotally mounted upon a stud 117 threaded into a hole 118 in an angle bracket 119, the angle bracket 119 being secured as at 120 to the upright 18. The opposite end of the lever 116 is provided with a reduced diameter portion 121 of circular cross-section which engages and actuates a portion of the timing and clutching mechanism 14.

The timing and clutching mechanism 14 is driven from a bevel pinion 122 (Figure 1) which is keyed or otherwise secured to the vertical motor-driven shaft 23. The bevel pinion 122 meshes with a bevel gear 123 (Figure 2) which is keyed to the forward end of a shaft 124. The latter is journaled in spaced bracket portions 125 and 126 mounted on a bracket 127 which is secured as at 128 to the upright 16. Keyed to the shaft 124 or integral therewith is a worm 129 which meshes with a worm gear 130.

The worm gear 130 is pinned or keyed to the rearward end of a shaft 131 which is journaled at its rearward end in a boss 132 on the bracket 127 and at its forward end in a bracket portion 133 (Figure 1) depending from the angle shelf 77 (Figure 3). Pinned to the forward end of the shaft 131 is a bevel pinion 134 which meshes with a bevel gear 135 pinned to a vertical shaft 136 which is journaled in the shelves 77 (Figure 1). Pinned to the shaft 136 is a crown clutch member 137 having notches 138 adapted to be engaged by a pair of teeth or pins 139 projecting axially from the hub 140 of a rotary cam 141. The cam 141 has an axial hump or lobe 142 with an incline 143, a flat portion 144 and an upstanding portion 145 (Figures 1, 2 and 5). The cam portion 103 on the bracket 95 is located in such a position that it engages the incline 143 and flat portion 144 (Figure 5), whereas the upstanding portion 145 is in a position to engage the end 102 of the latch-operating lever 99.

Secured as at 146 to the hub 140 of the cam 141 is one end of a flexible cable 147 which passes around the hub 140 and is secured at its opposite end 148 (Figure 2) to a hollow drum or spool 149 having a coil spring 150 secured at its outer end to the drum 149 and at its inner end to a stationary stud 151. The spring drum 149 and cable 147 serve to return the cam 141 to its starting position when the pins 139 are disengaged from the notches 138, as explained in connection with the operation thereof. The stud 151 is threaded into a post or boss 152 which rises from the shelf 77 (Figure 1).

The hub 140 is provided with an annular groove 153 (Figure 6) which is shaped to receive a collar 154 held in assembly therewith by a retaining ring 155 threaded onto the lower end of the hub 140. Mounted in the collar 154 and projecting radially outward therefrom in opposite directions are two pins 156 which engage slots 157 in the yoke portion 158 of a hand lever 159 (Figures 1, 2 and 3). The hand lever 159 is pivotally mounted upon a stud 160 which is threaded into an upstanding ear or boss 161 (Figure 1). The hand lever 159 at its forward end is provided with a ball or other handle 162 by which it may be shifted manually. Extending upward from and rigidly connected to or integral with the hand lever 159 is a vertical arm 163, the upper end of which is provided with a slot 164 through which the reduced diameter portion 121 of the lever 116 is inserted.

Extending outward from the collar 154 are spaced ears 165 (Figures 1 and 3) through which a pin 166 passes. The pin 166 extends through a slot 167 in the forward end of a rocking lever 168 which is pivotally mounted on a stud 169 threaded into a boss 170 projecting upward from the shelf 77. The forward end of the rocking lever 168 is inserted between the ears 165 whereas to the rearward end are attached spaced spring clips or clamps 171. These clamps 171 yieldingly engage the tube 172 of the mercury switch 54 and hold it in position.

In the operation of the invention, the machine is loaded by removing the holders 40 and impaling a frankfurter or other sausage S thereon. The holder 40 is then replaced in the machine in the position shown in Figure 2, with the pointed tip 34 passing through the squared aperture 33 and the portion 36 resting in the bottom 37 of the notch 38. In this manner, each of the holders 40 is loaded and inserted in the machine. The buns B into which the cooked sausages are to be inserted are split lengthwise by means of a knife or other suitable implement, and are then inserted into the bun toasters 13 by retracting the latch knobs 90 and opening the doors 80. The buns B are placed upon the racks 73 in inverted positions as shown in Figure 3, after which the doors 80 are closed and latched by means of the latches 87 entering the apertures 86 (Figure 2).

The motor (not shown) which drives the shaft 23 is then placed in operation and the knobs 63 of the hand levers 159 are pulled downward. As the shaft 23 rotates, it causes rotation of the holders 40 and hence the sausages S, and also causes rotation of the vertical shaft 136. The swinging of the knobs 162 downward pushes the collars 154 upward, and with them the hubs 140 of the cams 141. This action causes the pins 139 to enter the nearest notches 138 of the crown clutch member 137, causing the cam 141 to rotate. The same action rocks the lever 168 (Figure 1), tilting the mercury switch 54 so that the mercury M therein flows along the tube 172 thereof to electrically interconnect the electrodes 53 and 56. This action energizes the heating elements or units 49 and 65 of the sausage cooker 12 and bun toaster 13 respectively, causing them to give off heat and cook the sausages S and toast the buns B.

Meanwhile, the rotation of the shaft 136 and clutch member 137 rotates the cam 141 by the engagement of the pins 139 in the notches 138 until the cam 141 rotates to the point where the incline 143 thereof passes beneath the stationary cam portion 103 of the bracket 95. The cam portion 103 pushes the cam 141 downward (Figure 5) as the inclined portion 143 passes under the stationary cam portion 103 until the level or flat portion 144 is reached, by which time the pins 139 are pushed entirely out of the notches 138, severing the driving connection between the cam 141 and the rotating shaft 136.

In the meantime, however, the upstanding portion 145 of the cam 141 has engaged the rearward end of the latch-operating lever 99 (Figure 5), shifting the latter and thereby retracting the latch bolt 87 from the position shown in Figure 2 to that shown in Figure 5. Impelled by the spring 108 and the push rod 105, the door 80 of each bun toaster 13 flies open. The bun ejector 114 under the urge of the spring 108 then ejects each bun B part way out of its oven 72. As the push rod 105 approaches the end of its forward stroke, the cushion spring 112 engages the rearward end of the screw plug 111 and cushions the shock.

The rotation of the hub 140 of the cam 141 winds up the cable 147 upon the hub 140, unwinding the cable 147 from the drum 149 and winding up the spring 150 therein. When the cam 141 is forced downward in the manner just described, the disengagement of the pins 139 from the notches 138 leaves the hub 140 free to rotate loosely upon the shaft 136. The wound-up spring 150 within the drum 149 then winds the cable 147 thereon and unwinds it from the hub 140, rotating the cam 141 clockwise back to its starting position, ready for the commencement of a new cycle. As the collar 154 is moved downward along with the cam 141 by the stationary cam portion 103 of the bracket 95, the rock lever 168 is rocked about its pivot stud 169 into the position shown in Figure 1. This tilts the mercury switch 54 upward, causing the mercury M therein to run downhill so as to electrically disconnect the switch electrodes 56 and 53. The heating elements 49 and 65 of the sausage cookers 12 and bun toasters 13 are thus de-energized, terminating the cooking and toasting respectively. The operator then removes the cooked sausages and the toasted buns B and assembles them in the usual way, reloading the machine in the manner described above. The machine is then ready for restarting merely by pulling down the knobs 162 of the hand levers 159, and the foregoing cycle is repeated.

The vertical arm 163 of the hand lever 159 serves as an additional safety device by positively insuring that the collar 154 will be forced downward a sufficient distance. This is accomplished by the engagement of the block 115 (Figures 2 and 3) with the end of the lever 116 as the rod 105 is moved forward when the latch bolt 87 releases the door 80. The engagement of the reduced diameter portion 121 of the lever 116 with the slot 164 forcibly swings the arm 163 to the left and consequently shifts the collar 154 downward through the engagement of the pin and slot connection 156, 157 (Figure 1).

What I claim is:

1. An automatic sausage and bread cooker comprising a frame structure, a sausage holder rotatably mounted on said structure, a sausage holder rotator drivingly engaging said sausage holder, an electric sausage heater, an electric bread toaster having a bread support and a bread ejector movable relatively thereto to eject bread therefrom, a power source, mechanism drivingly connecting said power source to said rotator and including a clutch, and a timing device responsive to the expiration of a predetermined period of time for disengaging said clutch, de-energizing said heater and toaster, said timing device at the expiration of its time period effecting actuation of said bread ejector to eject the bread from said toaster.

2. An automatic sausage and bread cooker comprising a frame structure, a sausage holder rotatably mounted on said structure, a sausage holder rotator drivingly engaging said sausage holder, an electric sausage heater, an electric bread toaster, a power source, mechanism drivingly connecting said power source to said rotator and including a clutch, said toaster having a movable access door, a door opening device engaging and urging said door toward its open position and a timing device responsive to the expiration of a predetermined period of time for disengaging said clutch, deenergizing said heater and toaster said timing device at the expiration of its time period effecting operation of said door opening device to open said door.

3. An automatic sausage and bread cooker comprising a frame structure, a sausage holder rotatably mounted on said structure, a sausage holder rotator drivingly engaging said sausage holder, an electric sausage heater, an electric bread toaster, a power source, mechanism drivingly connecting said power source to said rotator and including a clutch, said toaster having a movable access door, a yielding element resiliently urging said door into its open position, a latch engaging said door, and a timing device responsive to the expiration of a predetermined period of time for disengaging said clutch, de-energizing said heater and toaster, said timing device at the expiration of said time period effecting retraction of said latch to open said door.

4. An automatic sausage and bread cooker comprising a frame structure, a sausage holder rotatably mounted on said structure, a sausage holder rotator drivingly engaging said sausage holder, an electric sausage heater, an electric bread toaster having a bread support thereon, a power source, mechanism drivingly connecting said power source to said rotator and including a clutch, said toaster having a movable access door, a yielding element resiliently urging said door into its open position, said yielding element having a bread ejector connected thereto, and movable relatively to said bread support to eject bread therefrom, and a timing device responsive to the expiration of a predetermined period of time for disengaging said clutch, de-energizing said heater and toaster, said timing device at the expiration of said time period effecting release of said ejector to eject the bread from said toaster.

5. An automatic sausage and bread cooker comprising a frame structure, a sausage holder rotatably mounted on said structure, a sausage holder rotator drivingly engaging said sausage holder, an electric sausage heater, an electric bread toaster, a power source, said toaster having a movable access door, a yielding element resiliently urging said door into its open position, a rotary shaft operatively connected to said power source and including a clutch, a movable latch device releasably holding said door in its closed position, and a cam operatively connected to said clutch and operatively engageable with said latch device to release the same, said cam being responsive to a predetermined rotation of said shaft to disengage said clutch and shift said latch device and effect opening of said door by said yielding element.

6. An automatic sausage and bread cooker comprising a frame structure, a sausage holder rotatably mounted on said structure, a sausage holder rotator drivingly engaging said sausage holder, an electric sausage heater, an electric bread toaster, a power source, said toaster having a movable access door, a yielding element resiliently urging said door into its open position, a rotary shaft operatively connected to said power source and including a clutch, a movable latch device releasably holding said door in its closed position, a movable bread ejector movably mounted on said bread toaster for motion relatively to said bread support and engageable with the door thereof, said ejector being held in its retracted position by said door in the closed position thereof, a cam operatively connected to said clutch and operatively engageable with said latch device to release the same, said cam being responsive to a predetermined rotation of said shaft to disengage said clutch and shift said latch device to release said door and consequently to release said bread ejector to eject the bread from said toaster.

GEORGE P. ANDREWS.

REFERENCES CITED

The following references are of record in the file of this patent:

UNITED STATES PATENTS

| Number | Name | Date |
| --- | --- | --- |
| Re. 22,781 | Anderson | Aug. 20, 1946 |
| 1,328,202 | Richardson | Jan. 13, 1920 |
| 1,541,472 | Born | June 9, 1925 |
| 1,634,142 | Hammond | June 28, 1927 |
| 1,731,743 | Harrison | Oct. 15, 1929 |
| 1,993,607 | Kalgreen | Mar. 5, 1935 |
| 2,075,474 | Scutt | Mar. 30, 1937 |
| 2,171,510 | Stirgwolt | Aug. 29, 1939 |
| 2,211,024 | Nardin | Aug. 13, 1940 |
| 2,295,993 | Gruettner | Sept. 15, 1942 |